Nov. 19, 1963  B. G. HOOD ETAL  3,111,365
PROCESS FOR MOLDING A UNIFORM POLYMETHANE FOAM IN A CLOSED MOLD
Filed Jan. 13, 1961
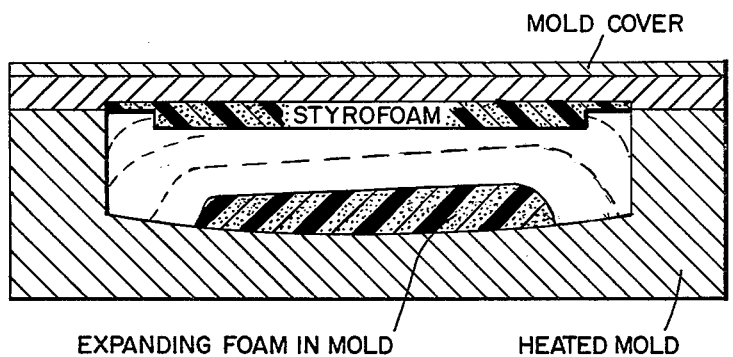
*INVENTORS*
BRUCE GARDNER HOOD
RALPH S. HOOD
BY ROBERT A. GARDELLA
*Russell, Chittick & Pfund*
ATTORNEYS United States Patent Office 3,111,365
Patented Nov. 19, 1963

3,111,365
PROCESS FOR MOLDING A UNIFORM POLYMETHANE FOAM IN A CLOSED MOLD
Bruce Gardner Hood and Ralph S. Hood, Marblehead, Mass., and Robert A. Gardella, Durham, N.H., assignors, by direct and mesne assignments, to Davidson Rubber Company, Inc., Dover, N.H., a corporation of New Hampshire
Filed Jan. 13, 1961, Ser. No. 82,548
6 Claims. (Cl. 18—48)

This invention relates to molding plastic foams and more particularly to a process for improving the uniformity of foam structure and minimizing the danger of foam collapse while molding low density urethane or the like foams in enclosed molds.

As the density of urethane or the like foams is lowered, these materials become increasingly more difficult to mold without the development of internal disconformities and/or fracture of the foam structure during molding. Accordingly it is a primary object of our invention to provide a process for minimizing this tendency of low density foams.

Our invention stems mainly from our discovery that, while molding low density foams in enclosed molds, both the pattern of flow of the foam and the elimination of air and gas from the space between the mold surface and the foam as it expands are critical. The flow pattern is made critical by the fact that these foams will not shift readily within their structure after the polymerization has progressed beyond a certain point. Thus any condition in which the foam is required to flow internally relative to its surface within the mold generally results in non-uniform foam structure and/or fracture of the foam. The conditions for expulsion of gas and entrapped air are also critical. Ordinarily the elimination of entrapped air is no problem. Split molds are not generally airtight and the air within the mold usually bleed off without difficulty. In the context of molding low density urethane foams in enclosed molds, however, several factors complicate the problem. First, the foam adheres readily to the mold wall. Thus no gas can pass along the mold wall after contact has been made between the foam and the mold. Second, due to the proportionately high volume of gas which evolves within the foam during molding, an evolution of gas at the surface of the foam also takes place during expansion. We have found that this surface released gas will not continue to evolve once adhesion between the foam and the mold surface has been established, but up to that point, great care must be taken to provide an expulsion path for such evolved gas.

In the preferred embodiment of our invention herein described, we accomplish the critical flow pattern and gas expulsion conditions simultaneously by a combination of two relatively simple but yet highly important techniques. First, we make sure that the foam forming ingredients are mixed in such a way that the foaming reaction starts in all parts of the charge practically simultaneously. Second, we pour the charge into the mold, taking care to distribute the same throughout the mold but with a slightly tapered pattern concentrating somewhat at one end of the mold. The simultaneous start for the foaming reaction is necessary to make sure that all parts of the foam will expand at a substantially uniform rate, and the pour pattern is necessary to ensure a gradual and progressive contact between the foam and the mold without substantial internal relative motion as long as the foam expansion is substantially uniformly and simultaneously progressive throughout.

Other aspects of our invention will best be understood and appreciated from a detailed description of a preferred embodiment thereof selected for purposes of illustration and shown in the accompanying drawings in which the single figure is a diagrammatic view in cross section of a split mold illustrating in solid lines the initial shape of the pour pattern and the growth thereof in dotted lines.

In the practice of our invention we employ a rapidly curing, low density polyurethane foam. An example of a foam used by us with success is as follows:

(1) 50 parts of a polyether glycol sold by Wyandotte Chemicals Corporation, Wyandotte, Michigan, under the trademark Pluracol TP-2540.

(2) 50 parts of a polyether glycol sold by Wyandotte Chemicals Corporation under the trademark Pluracol P1010.

(3) Approximately 5 parts Freon 11 sold by E. I. du Pont de Nemours & Company, Wilmington, Delaware.

(4) 42–44 parts toluene diisocyanate (80–20 isomer).

(5) 2.8 parts water.

(6) .2 part stannous octoate.

(7) 0.2 part of a triethylenediamine sold by Houdry Process Corporation, Philadelphia, Pennsylvania, under the name Dabco.

(8) 2–4 parts of a N-lauryl morpholine sold by the American Alcolac Corporation, Baltimore, Maryland.

(9) 1–1.5 parts of a silicone sold by Union Carbide Corporation, New York City, under the trademark X-520 or L-520.

The above ingredients when mixed together rapidly react to produce an excellent low density "one shot" polyurethane foam. Certain of the ingredients can be adjusted in accordance with known practice to meet varying conditions and produce desired effects. For instance, the Freon ingredient is particularly subject to choice and increasing it tends to reduce the effect of the exothermic heat generated during the reaction and lowers the density of the product. The hardness of the product may be increased by using a higher percentage of Pluracol TP-2540. In addition, other catalysts may be used, such as dibutyl tin diacetate sold by Metal & Thermit Corporation, Chemical Division, New York City. The preferred amount of silicone varies from batch to batch.

In carrying out the process of our invention we first mix the polyether glycol together with the Freon. Thereafter we mix items (6), (7), (8), and (9) of the above stated ingredients in a separate batch. This then leaves us with items (1) to (3) as one ingredient, items (4) and (5) as separate ingredients, and items (6), (7), (8), and (9) as a fourth component of the mix. At the instant of preparing the charge for the mold these four components containing the nine ingredients are violently agitated together and then poured into the mold with a slight concentration thereof toward one end of the mold. Thereafter the foam starts to expand within a few seconds and continues until it reaches the top of the mold at one end thereof. Finally the foam continues to expand and fills the mold completely, but during this final expansion the surface of the foam moves uniformly and progressively along the surface of the mold cover. In this way any gas which evolves from the surface of the foam during these final stages is gradually and uniformly expelled along the surface. Also this procedure ensures a gradual and uniform expansion of the foam in such a way that there is no requirement for internal relative motion of the foam structure.

In particular it should be noted that the simultaneous mixing of the foam ingredients has a particular relationship to the problem of uniform expulsion of gas from the mold and from the foam surface prior to its becoming adhesively attached to the mold surface. As the foam expands from its initial condition in which the pour pattern has a slight concentration at one end of the mold the foam itself must expand uniformly and substantially at the same rate throughout all of its portions in order to make sure that certain parts of the foam further away from the area of concentration do not reach the mold cover surface prematurely and thereby trap pockets of gas evolving from the surface of the foam itself. We regard this combination of techniques as highly important in our invention and desire to claim it broadly herein.

The mold we employ in this preferred embodiment is an enclosed mold and is made of fiberglass. The volume of the charge placed in the mold is gauged in relation to the mold size so that the foam would expand in the free state to between about 7% and 20% greater a volume than the mold cavity volume.

It should be noted in addition that the tapered pour pattern and simultaneous mix techniques of our invention result in a very uniform and progressive pressure build-up between the foam and the mold cavity. By starting at one end and working toward the other, all pressures in the form work only in one direction so that no cross pressures are built-up. This helps avoid shearing forces which result in pressure lines or fracture.

Since various modifications of the preferred embodiment herein shown will now suggest themselves to those skilled in the art, it is not our intention to confine the invention to the precise form herein shown or to the precise ingredients, but rather to limit the same in terms of the appended claims.

Having thus described and disclosed a preferred embodiment of our invention, what we claim as new and desire to secure by Letters Patent of the United States is:

1. In the process of simultaneously reacting, curing and molding polyurethane foam-forming materials in a flat horizontal enclosed mold the steps of: preparing for said mold the separate ingredients for a charge of said materials, mixing said materials and starting the reaction thereof in substantially all parts thereof at substantially the same moment thereafter, pouring the charge of said materials onto the floor of said mold in a tapered pour pattern wherein the weight concentration of said materials is slightly greater at one end of said mold, closing said mold, expanding said materials into a foam while expelling the air from the mold and gas released by said foam progressively along the mold surface toward one end of the mold, completing the cure of said foam, and removing the resultant molded article.

2. The process defined in claim 1 further characterized by the cover of said mold being generally horizontally disposed and substantially flat.

3. The process defined in claim 1 further characterized by said foam forming materials comprising: approximately 100 parts by weight of a polyether glycol having an average molecular weight of between about 1010–2540; 40–45 parts by weight of toluene diisocyanate; 1–4 parts by weight of water; and additional suitable proportions of operative catalysts and blowing agents.

4. The process defined in claim 1 further characterized by said foam forming materials comprising: approximately 100 parts by weight of a polyether glycol having an average molecular weight of between about 1010–2540; 40–45 parts by weight of toluene diisocyanate; 1–4 parts by weight of water; 2–10 parts by weight of a free blowing agent comprising a liquid having a boiling point when mixed in said resin of about 130° F.; and additional suitable proportions of operative catalysts.

5. The process defined in claim 1 further characterized by said mold being enclosed and by gauging the size of said mold in relation to the volume of said charge such that said charge will normally expand in the free state outside of said mold to a volume of between about 7% and 20% greater than the volume of said mold.

6. In the process of simultaneously reacting, curing and molding polyurethane foam-forming materials in a flat horizontal enclosed mold, the steps of: preparing for said mold the separate ingredients for a charge of said materials in an amount that would normally expand in the free state to a volume in the range of 7 to 20% greater than the volume of said mold, mixing said materials and starting the reaction thereof in substantially all parts thereof at substantially the same moment, pouring said materials onto the floor of said mold in a tapered pour pattern wherein the weight concentration of said materials is slightly greater at one end of said mold, closing said mold, expanding said materials into a foam while expelling the air from the mold and gas released by said foam progressively along the mold surface toward one end of the mold, completing the cure of said foam, and removing the resultant molded article.

References Cited in the file of this patent

UNITED STATES PATENTS

| | | |
|---|---|---|
| 2,642,920 | Simon et al. | June 23, 1953 |
| 2,653,139 | Sterling | Sept. 22, 1953 |
| 3,012,284 | Touhey | Dec. 12, 1961 |
| 3,056,168 | Terry | Oct. 2, 1962 |